No. 849,621. PATENTED APR. 9, 1907.
F. KEMPTER.
STUFFING BOX ARRANGEMENT FOR AGITATOR SHAFTS IN VACUUM STIRRING APPARATUS.
APPLICATION FILED FEB. 15, 1906.
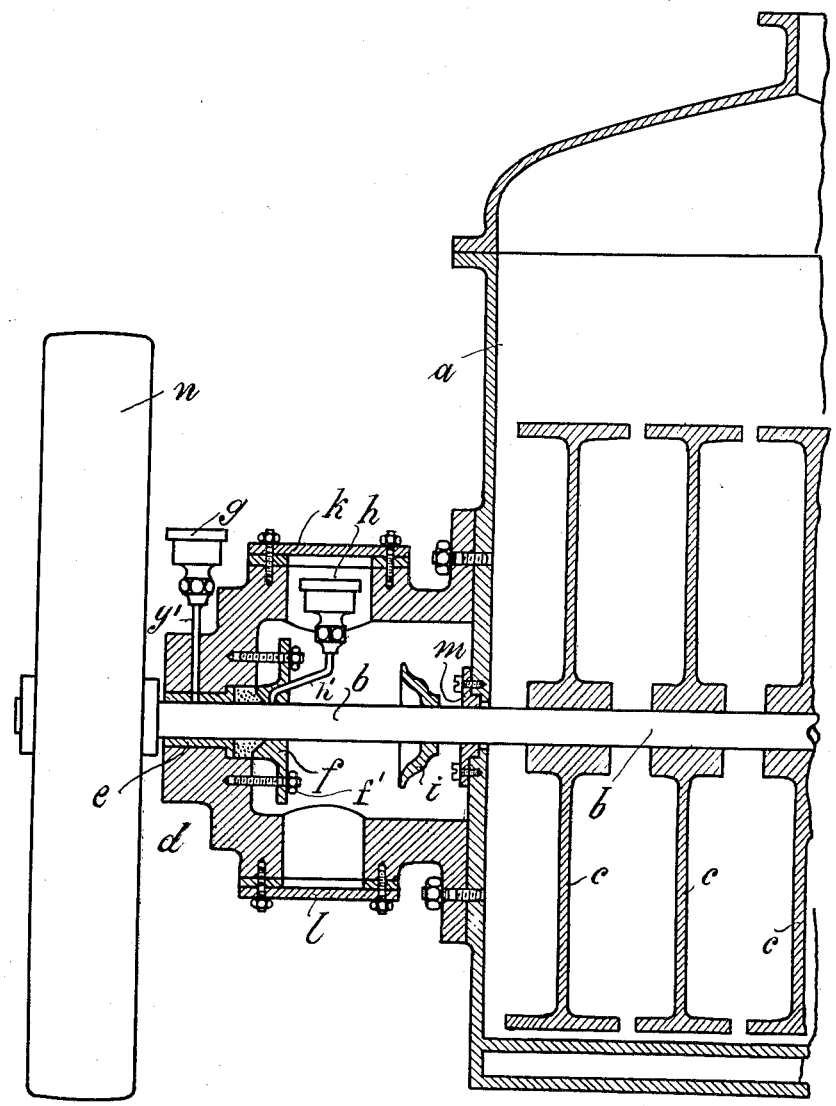

UNITED STATES PATENT OFFICE.

FRITZ KEMPTER, OF STUTTGART, GERMANY.

STUFFING-BOX ARRANGEMENT FOR AGITATOR-SHAFTS IN VACUUM STIRRING APPARATUS.

No. 849,621.  Specification of Letters Patent.  Patented April 9, 1907.

Application filed February 15, 1906. Serial No. 301,315.

*To all whom it may concern:*

Be it known that I, FRITZ KEMPTER, a subject of the King of Würtemberg, and a resident of Stuttgart, Kingdom of Würtemberg, German Empire, have invented a certain new and useful Stuffing-Box for Agitator-Shafts in Vacuum Stirring Apparatus, of which the following is a specification.

This invention relates to a bearing and stuffing-box for the shaft of vacuum stirring apparatus which is so constructed that the lubricating-oil is prevented from entering the vacuum-tank and injuriously affecting its contents.

The accompanying drawing represents a vertical longitudinal section of a stuffing-box embodying my invention.

$a$ indicates the vacuum-tank. $b$ indicates the agitator-shaft upon which the agitator-arms $c\ c\ c$ are mounted. The pulley $n$ serves for imparting movement to the shaft. On one side of the tank $a$ an air-tight casing $d$ is arranged which is provided at that end which is farthest away from the tank with a journal-box $e$ for the shaft $b$. The said journal-box is shut off air-tight from the interior of the casing $d$ by the stuffing-box $f$. The lubricating-cups $g$ and $h$ serve for the lubrication of the journal and of the stuffing-box, respectively. A ring $i$ is mounted upon the shaft $b$ between the oil-ducts $g'\ h'$ of cups $g$ $h$ and the wall of tank $a$ for the purpose of catching and throwing off any lubricating material which might run along the shaft. Windows $k$ and $l$ are provided for controlling and reaching the stuffing-box screws $f'$ and for removing any drippings of oil. In order to prevent the contents of the vacuum-tank from entering the casing $d$, a washer $m$, of rubber or the like, is provided at the point where the agitator-shaft passes through the wall of the tank. With this arrangement it is impossible for any lubricating material to enter the vacuum-tank, inasmuch as even in case the oil should run down the agitator-shaft when the shaft is arrested the oil would still be prevented from continuing to pass any farther by the ring $i$, and it is likely to be thrown off from the shaft when the machine is started. The oil which runs down directly from the stuffing-box collects on top of the window $l$.

The washer $m$ does not close casing $d$ airtight, and thus the vacuum in tank $a$ will also exist in casing $d$. Consequently the oil from the bearing cannot be sucked through casing $d$ into the tank.

What I claim is—

In a vacuum stirring apparatus, a vacuum-tank, combined with an air-tight casing communicating therewith, a journal-box in the exterior wall of said casing, a shaft projecting from the tank through the casing into the journal-box, and a stuffing-box within the casing, substantially as specified.

In witness whereof I have hereunto signed my name in the presence of two subscribing witnesses.

FRITZ KEMPTER.

Witnesses:
 A. KRETSCHMER,
 ERNST ENTENMANN.